United States Patent
Takahashi

(10) Patent No.: US 9,409,447 B2
(45) Date of Patent: Aug. 9, 2016

(54) PNEUMATIC TIRE

(71) Applicant: TOYO TIRE & RUBBER CO., LTD., Osaka-shi, Osaka (JP)

(72) Inventor: Toshihiko Takahashi, Osaka (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 164 days.

(21) Appl. No.: 14/186,346

(22) Filed: Feb. 21, 2014

(65) Prior Publication Data
US 2014/0238566 A1 Aug. 28, 2014

(30) Foreign Application Priority Data
Feb. 22, 2013 (JP) ................................. 2013-033375

(51) Int. Cl.
 *B60C 11/12* (2006.01)
 *B60C 11/117* (2006.01)
 *B60C 11/03* (2006.01)

(52) U.S. Cl.
 CPC ........... *B60C 11/1236* (2013.04); *B60C 11/032* (2013.04); *B60C 11/0304* (2013.04); *B60C2011/0341* (2013.04); *B60C 2011/0381* (2013.04); *B60C 2011/0388* (2013.04); *B60C 2011/1209* (2013.04)

(58) Field of Classification Search
 CPC .. B60C 11/03; B60C 11/0304; B60C 11/032; B60C 2011/0341; B60C 2011/0346; B60C 2011/0381; B60C 2011/0383; B60C 2011/0386; B60C 2011/0388; B60C 11/1204; B60C 11/1236; B60C 2011/1245; B60C 2011/1254; B60C 2011/129; B60C 2011/1209; B60C 2011/0374; B60C 2011/0376
 USPC .................. 152/209.1, 209.8, 209.17, 209.18
 See application file for complete search history.

(56) References Cited

U.S. PATENT DOCUMENTS

2009/0272474 A1* 11/2009 Nagai ................. B60C 11/0318
 152/209.18
2012/0273103 A1* 11/2012 Ishida ................. B60C 11/0306
 152/209.8

FOREIGN PATENT DOCUMENTS

CN 101360619 A 2/2009
CN 102756617 A 10/2012
(Continued)

OTHER PUBLICATIONS

JP 2006001357, Jan. 2006, English language machine translation [retrieved from http://worldwide.espacenet.com/publicationDetails/biblio?DB=worldwide.espacenet.com&II=4&ND=3&adjacent=true&locale=en_EP&FT=D&date=20060105&CC=JP&NR=2006001357A&KC=A].*

(Continued)

*Primary Examiner* — Eric Hug
(74) *Attorney, Agent, or Firm* — Westerman, Hattori, Daniels & Adrian, LLP

(57) ABSTRACT

A pneumatic tire includes a tread having at least one main groove and a plurality of ribs extending in the tire-circumferential direction. At least one of the ribs has a plurality of narrow grooves formed at intervals in the tire-circumferential direction. At least one intermittent sipe is formed corresponding to at least one of the narrow grooves. The narrow grooves are grooves each having a portion extending substantially along the tire-circumferential direction and having a groove width smaller than the at least one main groove. The at least one intermittent sipe has a plurality of holes that are intermittently formed, and at least one solid part located between adjacent two of the holes. The holes and the solid part are arranged in a direction intersecting the narrow grooves. The intermittent sipe intersects the corresponding narrow groove in the at least one solid part.

4 Claims, 9 Drawing Sheets

(56) References Cited

FOREIGN PATENT DOCUMENTS

| JP | 9-300918 A | 11/1997 | | |
| JP | 2006-1357 | * | 1/2006 | ............. B60C 11/12 |
| JP | 2009-292252 A | 12/2009 | | |

OTHER PUBLICATIONS

Office Action dated Dec. 3, 2015; issued in counterpart Chinese Application No. 201410032104.0 (5 pages).

* cited by examiner

F I G . 2
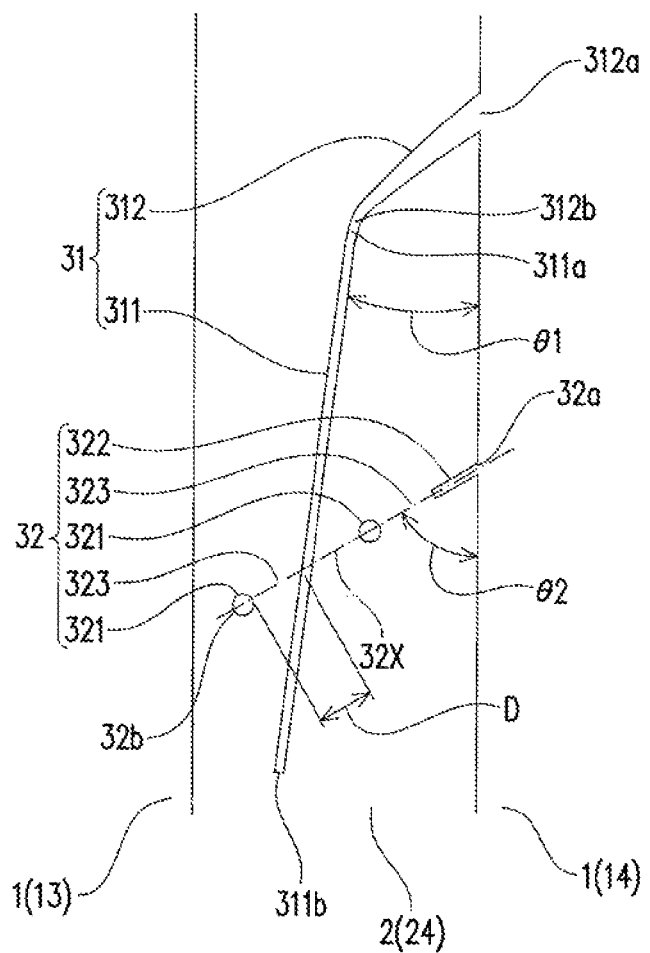

F I G . 3
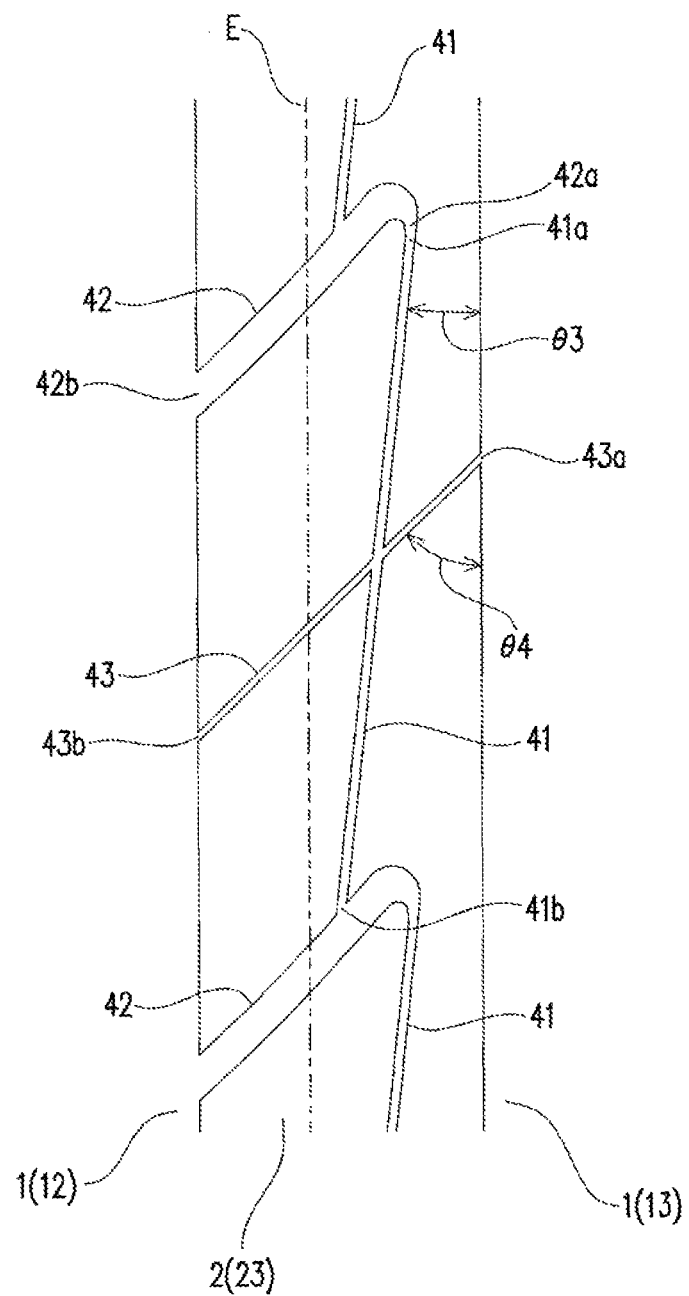

PNEUMATIC TIRE

CROSS-REFERENCE TO RELATED APPLICATION

This application claims priority to Japanese Patent Application No. 2013-033375, the disclosure of which is incorporated herein by reference in its entirety.

BACKGROUND OF THE INVENTION

1. Field of the Invention

The present invention relates to a pneumatic tire including a tread with a rib pattern.

2. Background Art

There have been proposed various structures for a rib pattern included in a tread of an pneumatic tire. Examples thereof include a pattern structure disclosed in JP 2009-292252 A.

As shown in FIG. 1 of JP 2009-292252 A, this pattern structure includes a rib formed, in the center region of the tread, as a land area interposed between two main grooves extending in the tire-circumferential direction. A narrow groove extending in the tire-circumferential direction is formed at the center in the tire-width direction of the rib (in coincidence with the tire equator). A plurality of curved grooves extend from each main groove toward the tire equator side. Each curved groove has one end opening into the corresponding main groove and the other end closed within the rib. In addition to this, a plurality of sipes (a plurality of grooves each having an extremely narrow width) extending from each main groove toward the tire equator are formed on the rib in the center region of the tread. Each sipe is formed continuously from one end to the other end, with one end connected to the corresponding main groove and the other end connected to the narrow groove. The sipe intersects the curved groove so as to divide it.

According to paragraph 0024 of JP 2009-292252 A, such intersection of the sipe with the curved groove can facilitate deformation of the curved groove with the rotation of the tire. This deformation of the curved groove can facilitate removal of snow stuck into the curved grooves. Therefore, this tire exhibits good performance on snow.

However, it is disadvantageous to facilitate the deformation of the curved groove, when driving a vehicle on a dry road. According to the invention of JP 2009-292252 A, the sipe is configured to intersect the curved groove so as to divide it for the purpose of enhancing the performance on snow. In such a configuration, the sipe and the curved groove intersect each other, thereby forming four corners surrounding the crossing point. In the case where the curved groove and the sipe intersect each other in driving a vehicle on a dry road, a corner on one side and a corner on the other side, with the sipe interposed therebetween as a boundary, of the rib having the curved groove and the sipe in the tire-circumferential direction (in the direction of rotation) deform with the rotation of the tire differently from each other, corresponding to the difference in how they make contact with the road. This causes the corner on the front side in the direction of the rotation (that is, the corner on the side that first comes into contact with the road) to be worn more significantly (intensively) than the corner on the back side in the direction of the rotation (that is, the corner on the side that afterwards comes contact with the road), with the one sipe interposed therebetween. Such wear causes the corner that first comes into contact with the road to be rounded. This is what is called uneven wear (particularly, this uneven wear is called "heel and toe wear"). Such uneven wear becomes significant as the travel distance of the vehicle increases. Increased uneven wear makes a level difference in the tread because of the rounded corner on the one side with respect to one sipe. This increases the driving noise. For this reason, there is a concern that the driver of the vehicle is made to feel uncomfortable.

SUMMARY OF THE INVENTION

It is therefore an object of the present invention to provide a pneumatic tire capable of suppressing an increase in driving noise by suppressing the occurrence of uneven wear (particularly heel and toe wear).

The present invention provides a pneumatic tire including a tread with a rib pattern, in which: the tread includes at least one main groove extending in a tire-circumferential direction, and a plurality of ribs, formed by the at least one main groove, extending in the tire-circumferential direction; at least one of the plurality of ribs has a plurality of narrow grooves formed at intervals in the tire-circumferential direction; one or a plurality of intermittent sipes are formed corresponding to at least one of the plurality of narrow grooves; the plurality of narrow grooves are a plurality of grooves each having a groove width smaller than the at least one main groove and having a portion extending substantially along the tire-circumferential direction; the intermittent sipes each have a plurality of holes that are intermittently formed, and one or a plurality of solid parts located between adjacent two of the plurality of holes; the plurality of holes and the one or plurality of solid parts are arranged in a direction intersecting the plurality of narrow grooves; and the one or plurality of intermittent sipes each intersect a corresponding narrow groove in one of the one or plurality of solid parts.

Further, the tire according to the present invention may have a configuration in which: the tread has an asymmetrical pattern with respect to a tire equator; at least part of each of the narrow grooves is formed of a sipe; and the narrow grooves and the intermittent sipes are formed in one of the plurality of ribs which is located, when the tire is mounted on a vehicle, on an outer side of the vehicle with respect to the tire equator.

Further, in one of the plurality of ribs which is located at the tire equator, a plurality of sets of one circumferential sipe extending substantially along the tire-circumferential direction and one or a plurality of continuous sipes extending to intersect the one circumferential sipe may be formed at intervals in the tire-circumferential direction.

Further, the circumferential sipe may have a portion substantially parallel to one of the plurality of narrow grooves.

Further, each of the narrow grooves may have a configuration including a first groove part and a second groove part, in which the first groove part has an oblique angle of 3° to 20° with respect to the main groove adjacent to the narrow groove, and the second groove part connects at least one of one end and the other end of the first groove part with the main groove.

Further, one of the plurality of ribs which is located at least in a region on one side in a tire-width direction may have a configuration including a plurality of grooves, each extending substantially along the tire-width direction, formed at a specific pitch in the tire-circumferential direction, in which the first groove part has a length in the tire-circumferential direction equal to or larger than a length corresponding to the specific pitch.

Further, the tire according to the present invention may have a configuration in which: the tread has an asymmetrical pattern with respect to the tire equator; the first groove part is oblique so that the one end comes close to the main groove adjacent to the first groove part on the outer side of the vehicle; and the second groove part is connected to the main groove adjacent to the first groove part.

Further, the tire according to the present invention may have a configuration in which: the tread has an asymmetrical pattern with respect to the tire equator; in at least one of the plurality of ribs which is located, when the tire is mounted on a vehicle, on the inner side of the vehicle with respect to the tire equator, a plurality of F-shaped blocks formed into a substantially F-shape by being defined by a plurality of sipes or grooves are arranged adjacent to each other in the tire-circumferential direction; each of the F-shaped blocks has a stem extending along the tire-circumferential direction in a region, on the tire equator side, of at least one rib located on an inner side of the vehicle, a first branch branching from a point in a course in the circumferential direction of the stem toward a side opposite to the tire equator, and a second branch branching from one end in the tire-circumferential direction of the stem toward a side opposite to the tire equator; in the at least one rib located on the inner side of the vehicle with respect to the tire equator, a first small block is interposed between the first branch of one of each two of the F-shaped blocks that are adjacent in the circumferential direction and the second branch of the other of the F-shaped blocks, and a second small block is surrounded by the stem, the first branch, and the second branch of each of the F-shaped blocks; the first branch and the second branch each have a relatively high stiffness; and the first small block and the second small block each have a relatively low stiffness.

Further, the tire according to the present invention may have a configuration in which: the tread has an asymmetrical pattern with respect to the tire equator; the tread includes a plurality of main grooves extending in the tire-circumferential direction; and one of the plurality of main grooves which is located, when the tire is mounted on a vehicle, furthest from the tire equator on an outer side of the vehicle has a smaller groove width than one or a plurality of other main grooves.

BRIEF DESCRIPTION OF THE DRAWINGS

FIG. 2 is an enlarged view of an outer intermediate rib.

FIG. 3 is an enlarged view of a center rib.

DETAILED DESCRIPTION OF THE PREFERRED EMBODIMENT

Now, the present invention is described with reference to a pneumatic tire (hereinafter, referred to as a "tire") according to one embodiment. In the following description representing the "inner and outer" directions, the inner side means the side closer to the center in the width direction of a vehicle on which the tire is mounted, and the outer side means the side farther therefrom.

Outline

Figure 1:
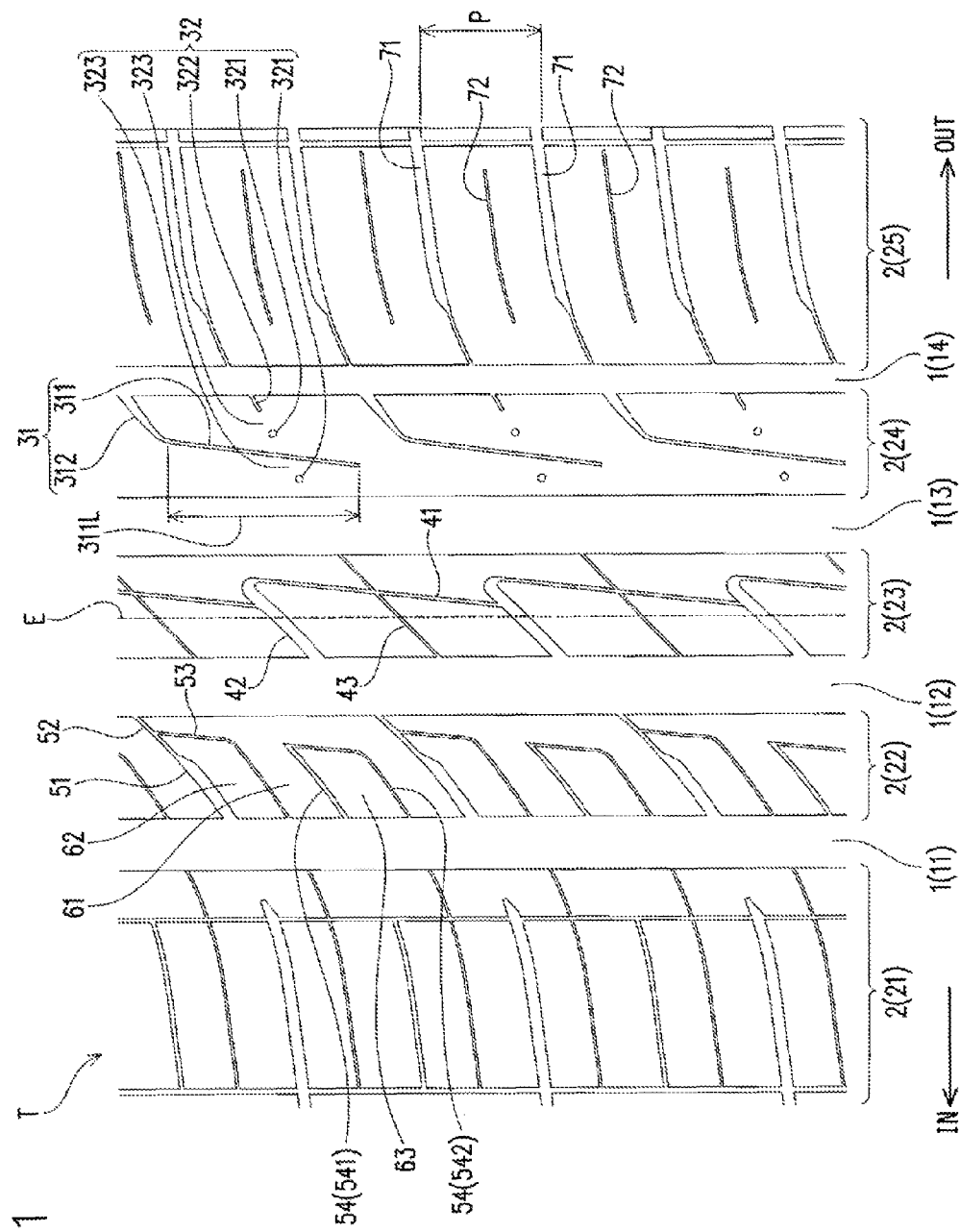
FIG. 1 is a view, from the radially outward direction, showing a tread pattern of a pneumatic tire according to one embodiment of the present invention.

FIG. 1 shows a tread pattern of a tire of this embodiment. This tread pattern of the tire is asymmetrical in the tire-width direction with respect to the tire equator E. When the tire is mounted on a vehicle, the right side in the figure is the outer side, and the left side in the figure is the inner side.

This tire has four main grooves 1 (11 to 14) each extending in the tire-circumferential direction. These main grooves 1 divide a tread T into parts, thereby forming ribs 2 as five land areas. The four main grooves 1 are formed as grooves wider than other grooves formed on the tire. Among the four main grooves 1, the outermost groove (hereinafter, referred to as the "outermost main groove") 14 is formed to have a groove width smaller than that of the other main grooves 11 to 13. This can increase the stiffness of an outer intermediate rib 24 and an outermost rib 25 between which the outermost main groove 14 is interposed. Therefore, the handling stability of the vehicle can be improved.

Next, a pattern structure of the ribs 2 is described in the order of the outer intermediate rib 24, a center rib 23, and an inner intermediate rib 22. It should be noted that, since the outermost rib 25 and the innermost rib 21 that are ribs adjacent respectively to tire shoulders (shoulder ribs) are each formed with grooves of a very common shape in tires, these ribs 21 and 25 are not described except for necessary points.

In the case of a groove shape, the sipes (these groove sipes are formed on a plate part of a mold used for producing tires) formed in this embodiment each suitably have a groove width of 0.3 mm to 1.5 mm. Further, in the case of a hole shape, the sipes (these hole sipes are formed on a rod part of the mold) each suitably have a diameter of 1.5 mm to 2.5 mm.

Pattern Structure of Outer Intermediate Rib

First, a pattern structure of the outer intermediate rib 24 is described. As shown in FIG. 1 and FIG. 2, the outer intermediate rib 24 has sets of a slightly oblique outer sipe 311, an oblique outer groove 312, and an intermittent sipe 32 formed at regular intervals in the tire-circumferential direction. Among these, the slightly oblique outer sipe 311 and the oblique outer groove 312 correspond to the "narrow grooves" in the claims. A plurality of sets of the slightly oblique outer sipe 311 and the oblique outer groove 312 are formed at regular intervals in the tire-circumferential direction.

The slightly oblique outer sipe 311 corresponds to the "first groove part" in the claims, and is a straight sipe (extremely narrow groove) formed to have an oblique angle (included angle between the outermost main groove 14 and the extension of the slightly oblique outer sipe 311) θ1 with respect to the outermost main groove 14, which is an acute angle of preferably 3° to 20°, more preferably 5° to 15°, as seen from the radially outward direction. That is, the slightly oblique outer sipe 311 is formed to have an oblique angle also with respect to the tire equator E, which is an acute angle of less than 45° (supposed that the tread T is horizontal in the tire-width direction).

The slightly oblique outer sipe 311 has one end (end on the upper side in the figure; the same applies to the following description) 311a located in an outer region of the outer intermediate rib 24. The slightly oblique outer sipe 311 has the other end (end on the lower side in the figure; the same applies to the following description) 311b located in an inner region of the outer intermediate rib 24. That is, the slightly oblique outer sipe 311 is a sipe formed right up in the figure. The one end 311a of the slightly oblique outer sipe 311 is connected to the other end 312b of the oblique outer groove 312. This allows water entering the slightly oblique outer sipe 311 to move upward in the figure through the slightly oblique outer sipe 311 so as to flow into the oblique outer groove 312. On the other hand, the other end 311b of the slightly oblique outer sipe 311 is closed within the outer intermediate rib 24.

The tread T has a plurality of grooves formed at a specific pitch in a rib (at least one of the innermost rib 21 and the outermost rib 25) on at least one end in the tire-width direction. The slightly oblique outer sipe 311 has a length (length along the tire-circumferential direction) 311L, from the one end 311a to the other end 311b (see FIG. 1), set to not smaller than the length corresponding to the specific pitch of the plurality of grooves formed in the tread T. In this embodiment, sets of a relatively wide groove 71 and a relatively narrow groove (sipe) 72 are alternately formed in the outermost rib 25 at regular intervals in the tire-circumferential direction. The "length corresponding to the specific pitch" is a length P which corresponds to an interval in the tire-circumferential direction between adjacent wide grooves 71 or a length which corresponds to an interval in the tire-circumferential direction between adjacent narrow grooves (sipes) 72.

Forces to be received by the tire from the road (a force due to the vehicle weight to which a centrifugal force is added) are applied intensively to the outer intermediate rib 24 of the tire located on the outer side of the curve of a corner during vehicle cornering. The slightly oblique outer sipe 311 has an extremely small groove width, and thus has a small space to permit a positional deviation between a region on one side and a region on the other side of the slightly oblique outer sipe 311 with the space interposed therebetween. Therefore, as compared to a groove having a large groove width (for example, the "curved groove" disclosed in JP 2009-292252 A), the positional deviation can be reduced. Accordingly, as compared to the case of forming a groove having a large groove width, the stiffness of the outer intermediate rib 24 can be appropriately maintained high. As a result of this, the handling stability of the vehicle can be improved by suppressing deformation of the outer intermediate rib 24 during vehicle cornering.

The oblique outer groove 312 corresponds to the "second groove part" in the claims, and is a groove having a groove width larger than that of the sipes. The oblique outer groove 312 is a lug groove extending obliquely upward in the figure from the one end 311a of the slightly oblique outer sipe 311 to be connected to the outermost main groove 14. The oblique outer groove 312 is formed into a "V" shape so as to have a groove width that is narrow at the other end 312b connected to the one end 311a of the slightly oblique outer sipe 311, and is wide at one end 312a connected to the outermost main groove 14. Therefore, the flow channel of water flowing from the slightly oblique outer sipe 311 is widened toward the one end 312a. This allows water to flow through the oblique outer groove 312 efficiently into the outermost main groove 14. Accordingly, even when the road is wet due to rainfall, etc., a water film is less likely to be formed between the road and the outer intermediate rib 24, thereby suppressing a decrease in frictional force against the road. Further, as has been described, the slightly oblique outer sipe 311 has the length 311L along the tire-circumferential direction equal to or larger than a length corresponding to the specific pitch. Such length of the slightly oblique outer sipe 311 allows water in the outer intermediate rib 24 to be rapidly guided to the slightly oblique outer sipe 311.

In this embodiment, the intermittent sipe 32 intersects the slightly oblique outer sipe 311 at a point about ⅖ (of the full length) upward in the figure from the other end 311b. The intermittent sipe 32 is configured by intermittently forming two small holes 321 arranged with the slightly oblique outer sipe 311 interposed therebetween, and a short sipe 322 located outward on the extension of these two small holes 321 and connected to the outermost main groove 14. Solid parts 323 that are solid (formed with no grooves or recesses) are formed between the two small holes 321 and between one of the small holes 321 and the short sipe 322. The intermittent sipe 32 intersects the slightly oblique outer sipe 311 in one of the solid parts 323 that is located between the two small holes 321. The distance D along an extension 32X of the intermittent sipe 32 between the slightly oblique outer sipe 311 and one of the small holes 321 with the corresponding solid part 323 interposed therebetween is suitably 1 to 5 mm. The small holes 321 are each a circular hole, as seen from the radially outward direction. None of the two small holes 321 and the short sipe 322 is connected to the slightly oblique outer sipe 311. Further, the extension direction in which the two small holes 321, the short sipe 322, and the solid parts 323 are arranged is the same as that of the slightly oblique outer sipe 311, in that one end 32a (belonging to the short sipe 322) is located in an outer region of the outer intermediate rib 24, and the other end 32b (belonging to one of the small holes 321 that is located on the inner side) is located in an inner region of the outer intermediate rib 24. However, the oblique angle (included angle between the extension 32X and the outermost main groove 14) θ2, with respect to the outermost main groove 14, of the extension 32X of the intermittent sipe 32 is larger than that (oblique angle θ1) of the slightly oblique outer sipe 311.

Formation of such an intermittent sipe 32 makes it possible to reduce the stiffness of the outer intermediate rib 24 to an appropriate extent, as compared to the case where no grooves intersecting the slightly oblique outer sipe 311 are formed in the outer intermediate rib 24. When the outer intermediate rib 24 has an appropriately reduced stiffness (in other words, when the outer intermediate rib 24 is moderately softened), the outer intermediate rib 24 is allowed to make good contact with the road. Therefore, it is possible to improve the transmissibility of the driving force and braking force from the tire to the road. Further, the vibration absorbability of the tire is enhanced by the degree to which the stiffness is reduced. Therefore, the driving noise (impact noise) generated from the tire can be reduced, which can contribute to meeting current noise regulations for vehicles. The ride quality of passengers is also improved.

Figure 5A:
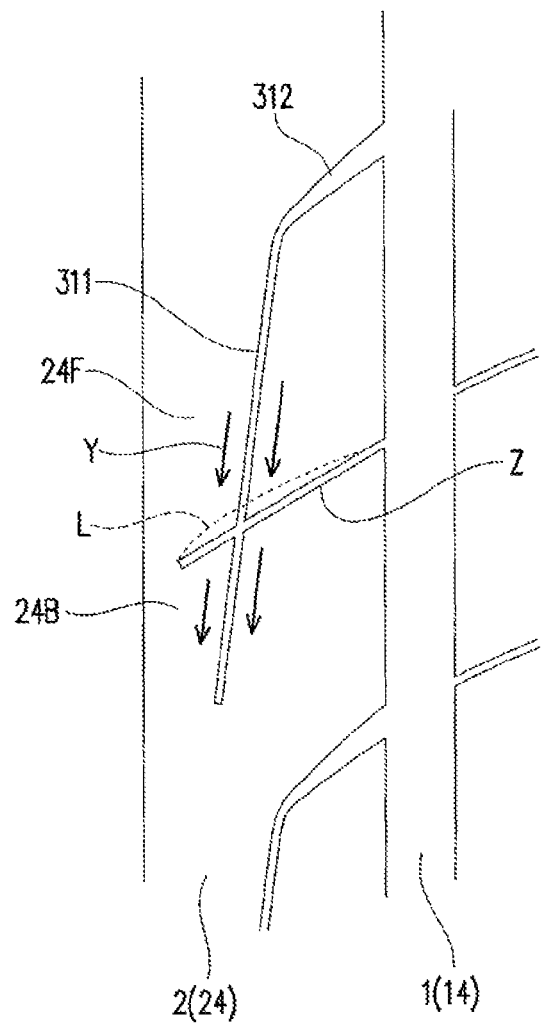
FIG. 5A is an enlarged view, from the radially outward direction, showing a main part of a comparative example in which a slightly oblique sipe and another sipe intersect each other.
Figure 5B:
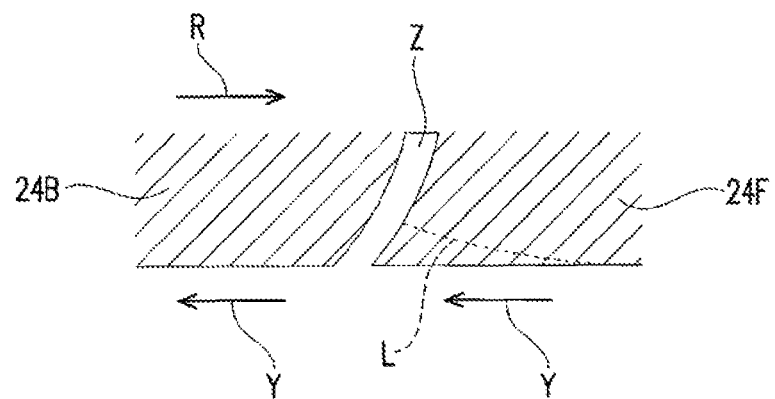
FIG. 5B is an enlarged view showing a cross section along the circumferential direction of a region surrounding the crossing point of the slightly oblique sipe and the other sipe in a deformed state.

In addition to above, formation of the intermittent sipe 32 can prevent separation of the region, surrounding the slightly oblique outer sipe 311, of the outer intermediate rib 24. This advantage is described with reference to a comparative example in which another sipe Z formed into a straight shape intersects the slightly oblique outer sipe 311, for example, as shown in FIGS. 5A and 5B. In this comparative example, the region, surrounding the slightly oblique outer sipe 311, of the outer intermediate rib 24 is divided by the sipe Z into the front and rear sections in the tire-rotation direction R (see FIG. 5B). Therefore, when the tire rotates so that corners 24F and 24B formed by the division come into contact with the road, the corners 24F and 24B are each displaced (deform) in the direction indicated by the arrow Y in the figure, that is, the direction opposite to the tire-rotation direction R due to the friction with the road. If a frictional force against the road acts on each of the corners 24F and 24B in such a displaced state, the corner 24F that first comes into contact with the road receives the frictional force in a wide range and thus wears more significantly (intensively) than the corner 24B that afterwards comes into contact with the road, with the sipe Z being interposed therebetween. As the wear proceeds, the region closer to the other sipe Z than the line L shown as a dashed line in FIGS. 5A and 5B is worn away. Therefore, after the wear has proceeded, a level difference occurs between the corners 24F and 24B in the radial direction. This is so-called uneven wear (particularly heel and toe wear).

On the other hand, this embodiment allows the region, surrounding the slightly oblique outer sipe 311, of the outer intermediate rib 24 to be maintained in a continuous state without being divided by the intermittent sipe 32 into the front and rear sections in the tire-rotation direction R, unlike in the comparative example. Therefore, the occurrence of uneven wear (particularly heel and toe wear) as in the comparative example can be suppressed.

Pattern Structure of Center Rib

Next, a pattern structure of the center rib 23 is described. As shown in FIG. 1 and FIG. 3, the center rib 23 has sets of a slightly oblique center sipe 41, an oblique center groove 42, and a continuous sipe 43 formed at certain intervals in the tire-circumferential direction.

The slightly oblique center sipe 41 is a straight sipe that corresponds to the "circumferential sipe" in the claims. The slightly oblique center sipe 41 has one end 41a located in an outer region of the center rib 23, and the other end 41b located slightly outwardly of the tire equator E in the center rib 23. That is, the slightly oblique center sipe 41 is a sipe formed right up in the figure, in the same manner as the slightly oblique outer sipe 311. The slightly oblique center sipe 41 has an oblique angle (included angle between the main groove 13 and the extension of the slightly oblique center sipe 41) θ3 with respect to a main groove 13 located on the outer side of the tire equator E is substantially equal to the oblique angle θ1 of the slightly oblique outer sipe 311. That is, as shown in FIG. 1, the slightly oblique center sipe 41 is substantially parallel to the slightly oblique outer sipe 311. Therefore, the stiffness in the tire-circumferential direction can be made uniform in the region between the slightly oblique center sipe 41 and the slightly oblique outer sipe 311 that are in a substantially parallel relationship. Therefore, the edges (groove edges), facing the main groove 13 located on the outer side of the tire equator E, in the width direction of the center rib 23 and the outer intermediate rib 24 can be suppressed from being intensively worn partially in the circumferential direction due to the stiffness difference. Further, it is possible to give a feeling of design unity to those who see the tire (tread T). However, the slightly oblique center sipe 41 is not limited to those formed to have an oblique angle substantially equal to that of the slightly oblique outer sipe 311. For example, the slightly oblique center sipe 41 may be formed to have an oblique angle different from that of the slightly oblique outer sipe 311, such as those expanded downward in the figure (in a reverse "V"-shaped relationship to the slightly oblique outer sipe 311).

The one end 41a of the slightly oblique center sipe 41 is connected to one end 42a of the oblique center groove 42. This allows water entering the slightly oblique center sipe 41 to move upwardly in the figure through the slightly oblique center sipe 41 so as to flow into the oblique center groove 42.

Further, the other end 41b of the slightly oblique center sipe 41 is also connected to the oblique center groove 42 (another one different from the oblique center groove 42 to which the one end 41a is connected) located below the slightly oblique center sipe 41 in the figure. As shown in the figure, the other end 41b of the slightly oblique center sipe 41 is connected to a side in the course of the oblique center groove 42.

The oblique center groove 42 is a groove having a larger groove width than the slightly oblique center sipe 41. The oblique center groove 42 is a lug groove extending obliquely downward in the figure from the one end 41a of the slightly oblique center sipe 41 to be connected to a main groove 12 located on the inner side of the tire equator E at the other end 42b thereof. The groove width of the oblique center groove 42 is constant in most part, and is reduced in the periphery of the one end 42a connected to the slightly oblique center sipe 41. The oblique center groove 42 can guide water entering the slightly oblique center sipe 41 and flowing out of the slightly oblique center sipe 41 to the main groove 12.

The continuous sipe 43 is a straight sipe with one end 43a connected to the main groove 13 located on the outer side of the tire equator E, and the other end 43b connected to the main groove 12 located on the inner side of the tire equator E. The continuous sipe 43 is formed substantially parallel to the oblique center groove 42 in the part with a constant groove width. The continuous sipe 43 has an oblique angle (included angle between the continuous sipe 43 and the main groove 13) θ4, with respect to the main groove 13 located on the outer side of the tire equator E, larger than the oblique angle θ3 of the slightly oblique center sipe 41. Accordingly, the slightly oblique center sipe 41 intersects the continuous sipe 43. This intersection is located substantially at the center of the slightly oblique center sipe 41.

In the center rib 23 configured as above, the other end 41b of the slightly oblique center sipe 41 is connected to the oblique center groove 42, and the slightly oblique center sipe 41 and the continuous sipe 43 intersect each other. Therefore, as compared to the outer intermediate rib 24 in which the slightly oblique outer sipe 311 is not divided by the intermittent sipe 32 as mentioned above, the stiffness of the center rib 23 is relatively reduced. In this way, when the stiffness of the center rib 23 is relatively reduced, in other words, the center rib 23 is softened, the center rib 23 is allowed to make good contact with the road. Therefore, it is possible to improve the transmissibility of the driving force and braking force from the tire to the road. Further, the vibration absorbability is enhanced by the degree to which the stiffness is relatively reduced. Therefore, the driving noise (impact noise) generated from the tire can be reduced, which can contribute to meeting current noise regulations for vehicles. The ride quality of passengers is also improved.

In the outer intermediate rib 24, the slightly oblique outer sipe 311 is maintained in a continuous state without being divided by forming the intermittent sipe 32 in order to suppress the occurrence of uneven wear (particularly, heel and toe wear). In contrast, in the center rib 23, the slightly oblique center sipe 41 and the continuous sipe 43 intersect each other, and thus the slightly oblique center sipe 41 is in a divided state. The reason for this is that, since the circumferential length of a pneumatic tire is largest at the tire equator E, the circumferential velocity in vehicle driving of the center rib 23 is lower than that of other parts away from the tire equator E. That is, the possibility of occurrence of uneven wear is lower in the center rib 23 than in the outer intermediate rib 24. Accordingly, such intersection of sipes in the center rib 23 does not matter significantly.

Relationship of Center Rib and Outer Intermediate Rib

The outer intermediate rib 24 has a relatively higher stiffness than that of the center rib 23 that is adjacent thereto. Therefore, it is possible to effectively resist the forces applied, during vehicle cornering, to the outer intermediate rib 24 from the road (a force due to the vehicle weight to which a centrifugal force is added). Accordingly, the vehicle handling stability can be improved by suppressing deformation of the outer intermediate rib 24 during vehicle cornering.

Further, the slightly oblique center sipe 41 of the center rib 23 is connected to the main groove 12 located on the inner side of the tire equator E via the oblique center groove 42, as mentioned above. On the other hand, the slightly oblique center sipe 41 is closed to the main groove 13 located on the outer side of the tire equator E. Further, the continuous sipe 43 of the center rib 23 is connected to the main groove 12 located on the inner side of the tire equator E and the main groove 13 located on the outer side of the tire equator E. Furthermore, the slightly oblique outer sipe 311 of the outer intermediate rib 24 is connected to the outermost main groove 14 via the oblique outer groove 312. On the other hand, the slightly oblique outer sipe 311 is closed to the main groove 13 located on the outer side of the tire equator E. Further, the intermittent sipe 32 of the outer intermediate rib 24 has the short sipe 322 that is connected to the outermost main groove 14 but closed to the main groove 13 located on the outer side of the tire equator E. That is, only the continuous sipe 43 is connected to the main groove 13 located on the outer side of the tire equator E.

Therefore, the stiffness can be made higher in regions located on the outer side of the tire equator E (which correspond to the inner and outer ribs 23 and 24 with the main groove 13 located on the outer side of the tire equator E being interposed therebetween) than in other regions (ribs having other main grooves interposed). Accordingly, it is possible to suppress deformation of the tire located on the outer side of the curve during vehicle cornering in regions, located on the outer side of the tire equator E, to which forces to be received by the tire from the road (a force due to the vehicle weight to which a centrifugal force is added) are intensively applied. Therefore, the vehicle handling stability can be improved.

Further, there is no grooves connected, on the outer side, to the main groove 13 located on the outer side of the tire equator E. On the other hand, on the inner side, the continuous sipe 43 is connected to the main groove 13 as mentioned above. Therefore, among the inner and outer regions with the main groove 13 located on the outer side of the tire equator E being interposed therebetween, the stiffness is made higher in the outer regions than in the inner regions. This also can improve the vehicle handling stability by suppressing deformation in the corresponding regions during vehicle cornering.

Pattern Structure of Inner Intermediate Rib

Figure 4:
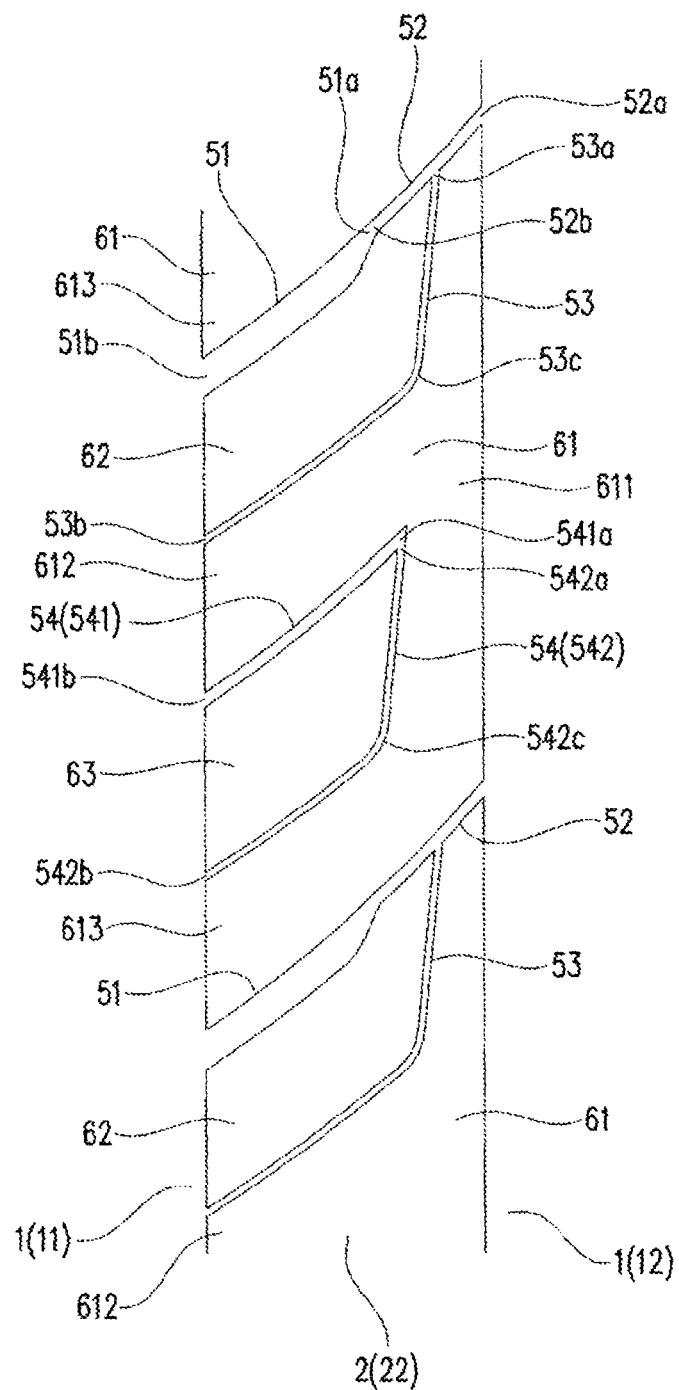
FIG. 4 is an enlarged view of an inner intermediate rib.

Next, a pattern structure of the inner intermediate rib 22 is described. As shown in FIG. 1 and FIG. 4, the inner intermediate rib 22 has sets of an inner lug groove 51, an extended sipe 52, a first curved sipe 53, and a second curved sipe 54 formed at certain intervals in the tire-circumferential direction.

The inner lug groove 51 is a groove extending, while being slightly curved, obliquely upward in the figure from the innermost main groove 11 (specifically, curved to be convex downward in the figure). The inner lug groove 51 has one end 51a located at about ⅓ from the outer edge of the inner intermediate rib 22, and the other end 51b connected to the innermost main groove 11. The inner lug groove 51 has almost the same groove width as the oblique center groove 42.

The extended sipe 52 is located on the outward extension of the inner lug groove 51. The extended sipe 52 has one end 52a connected to the second main groove 12 from the inner side, and the other end 52b connected to the one end 51a of the inner lug groove 51. The extended sipe 52 has a groove width that is smaller than that of the inner lug groove 51 but larger than that of the first curved sipe 53 mentioned below.

The first curved sipe 53 is located below the inner lug groove 51 and the extended sipe 52 in the figure. The first curved sipe 53 is connected to the innermost main groove 11 at the other end 53b, extends substantially parallel to the inner lug groove 51 and the extended sipe 52, changes its extension direction substantially upward in the figure at an inflection point 53c located at about ⅕ from the outer edge of the inner intermediate rib 22, and is connected to the extended sipe 52 at one end 53a. A first small block 62 having a substantially parallelogram shape is formed by being surrounded by the first curved sipe 53, the inner lug groove 51, the extended sipe 52, and the innermost main groove 11. The section between the one end 53a and the inflection point 53c of the first curved sipe 53 is formed to be substantially parallel to the slightly oblique outer sipe 311 and the slightly oblique center sipe 41, as shown in FIG. 1. Therefore, it is possible to give a feeling of design unity to those who see the tire.

The second curved sipe 54 is located below the first curved sipe 53 in the figure, and is composed of a first part 541 and a second part 542. The first part 541 is connected to the innermost main groove 11 at the other end 541b, extends substantially parallel to the inner lug groove 51 and the extended sipe 52, and has one end 541a located at about ¼ from the outer edge of the inner intermediate rib 22. The first part 541 has the same groove width as the extended sipe 52. The second part 542 is located below the first part 541 in the figure. The second part 542 is connected to the innermost main groove 11 at the other end 542b, extends substantially parallel to the first part 541, changes its extension direction substantially upward in the figure at an inflection point 542c located at about ¼ from the outer side of the inner intermediate rib 22, and is connected to the one end 541a of the first part 541 at one end 542a. The second part 542 has the same groove width as the first curved sipe 53. A second small block 63 having a substantially parallelogram shape is formed by being surrounded by the second curved sipe 54 and the innermost main groove 11. The section between the one end 542a and the inflection point 542c of the second part 542 is formed substantially parallel to the slightly oblique outer sipe 311, the slightly oblique center sipe 41, and the first curved sipe 53 (in the section between the one end 53a and the inflection point 53c), as shown in FIG. 1. Therefore, it is possible to give a feeling of design unity to those who see the tire (tread T).

By forming the grooves 51 to 54, an F-shaped block 61 having a shape similar to a capital letter "F" of the alphabet (substantially F-shaped), as seen from the radially outward direction, and the first small block 62 and the second small block 63 that are adjacent to the F-shaped block 61 are formed in the inner intermediate rib 22. The F-shaped block 61 is formed such that a plurality of upside down "F" shapes are formed adjacent to each other via the extended sipe 52 in the tire-circumferential direction, as shown in the figure, and the corresponding sets of the first small block 62 and the second small block 63 are alternately formed in the tire-circumferential direction.

As shown in FIG. 4, the F-shaped block 61 has a stem 611 extending along the tire-circumferential direction in a region, on the tire equator E side, of the inner intermediate rib 22 (region on the right side in the figure), a first branch 612 branching substantially from the center in the circumferential direction of the stem 611 toward the side opposite to the tire equator E, and a second branch 613 branching from one end in the tire-circumferential direction of the stem 611 (lower end in the figure) toward the side opposite to the tire equator E (the left side in the figure). The stem 611 corresponds to the vertical rod part of the letter "F", and the first branch 612 and the second branch 613 respectively correspond to the transverse branch parts of the letter "F".

Each two F-shaped blocks 61 that are adjacent to each other in the circumferential direction are arranged such that the first small block 62 is interposed between the first branch 612 of one of the F-shaped blocks 61 and the second branch 613 of the other of the F-shaped blocks 61, and the second small block 63 is surrounded by the stem 611, the first branch 612, and the second branch 613 of each of the F-shaped blocks 61.

Due to the respective shapes of the blocks 61 to 63, the inner intermediate rib 22 has a relatively high stiffness in the outer region (in which the stem 611 is formed) where a relatively small number of sipes extending substantially in the tire-width direction are formed, whereas the inner intermediate rib 22 has a relatively low stiffness in the inner region (in which the first branch 612, the second branch 613, the first small block 62, and the second small block 63 are formed) where a relatively large number of sipes extending substantially in the tire-width direction are formed. The tire located on the outer side of the vehicle in cornering (turn) is subjected to a lower ground contact pressure in the inner region of the tread T than in the outer region thereof. The inner intermediate rib 22 of this embodiment can achieve a difference in stiffness corresponding to the difference in ground contact pressure. That is, the inner intermediate rib 22 has high stiffness in the outer region that is subjected to a high ground contact pressure, while having low stiffness in the inner region that is subjected to a low ground contact pressure. Further, the inner intermediate rib 22 shows good vibration absorbability in the inner region due to the relatively low stiffness. Therefore, the driving noise (impact noise) generated from the tire can be reduced.

In the inner region of the inner intermediate rib 22 (the left side region in the figure), the first branch 612 and the second branch 613 are integrated with the stem 611 and therefore each have a relatively high stiffness, and the first small block 62 and the second small block 63 each have a relatively low stiffness. In the inner region, the first small block 62, the first branch 612, the second small block 63, and the second branch 613 are arranged in this order in the tire-circumferential direction (direction from the top to the bottom in the figure), as shown in FIG. 1 and FIG. 4, and this order of the arrangement is repeated throughout the entire circumference of the tire. Therefore, the inner region has a pattern structure in which the relative stiffness is alternately set to be "low •high •low •high" regularly in the tire-circumferential direction. Accordingly, it is possible to make the wear in the tire-circumferential direction uniform, as compared to a pattern structure in which the relative stiffness is not alternately set, for example, to be "high •low •low •high •high •low".

Further, in the F-shaped block 61, the stem 611 extending in the up-down direction in the figure is reinforced in the tire-width direction by the first branch 612 and the second branch 613 extending in the width direction. Therefore, it is possible to effectively resist external forces in the width direction (lateral forces) applied, during vehicle cornering, etc., to the tire, so as to suppress deformation of the inner intermediate rib 22. Accordingly, the vehicle handling stability can be improved.

Summary of Each Rib

In the ribs 22 to 24 each having the aforementioned pattern structure, the outer intermediate rib 24 located on the outer side has the highest stiffness, the center rib 23 has a stiffness lower than that of the outer intermediate rib 24, and the inner intermediate rib 22 has a stiffness lower than that of the center rib 23. Therefore, the tread surface is allowed to have an appropriate strength in the outer region, to which forces from the road is applied most, particularly during vehicle cornering. On the other hand, the tread surface can come into contact relatively softly with the road in the inner region, which leads to good vibration absorbability. Therefore, the driving noise (impact noise) generated from the tire can be reduced, which can contribute to meeting current noise regulations for vehicles. The ride quality of passengers is also improved. The presence of such a difference in stiffness between the inner and outer regions can suppress the wear in which the tread is worn more in one region in tire-width direction than in the other region, as compared to the case where the stiffness is uniform between the inner and outer regions.

Examples and Evaluation Thereof

Figure 6:
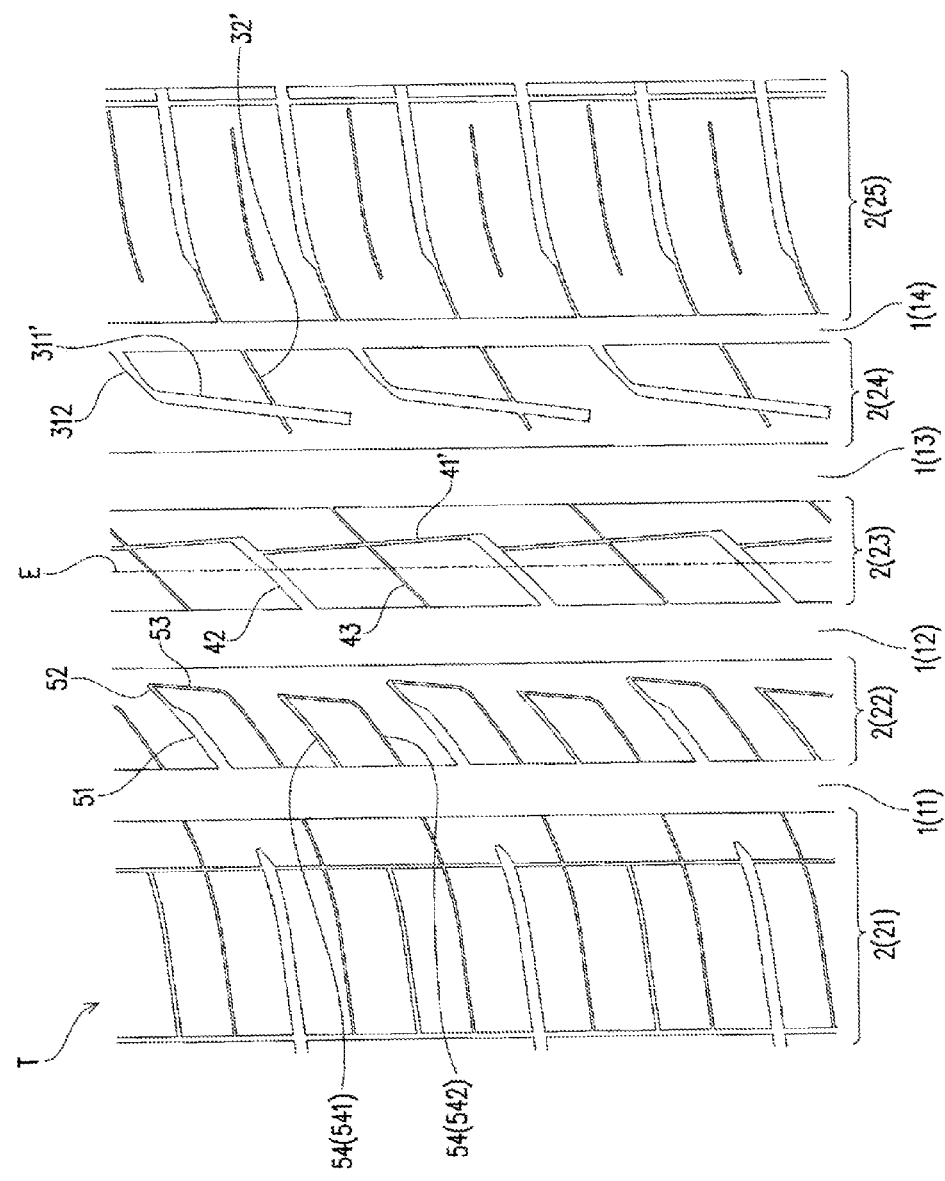
FIG. 6 is a view, from the radially outward direction, showing a tread pattern of a pneumatic tire according to Comparative Example 1 subjected to evaluation.
Figure 7:
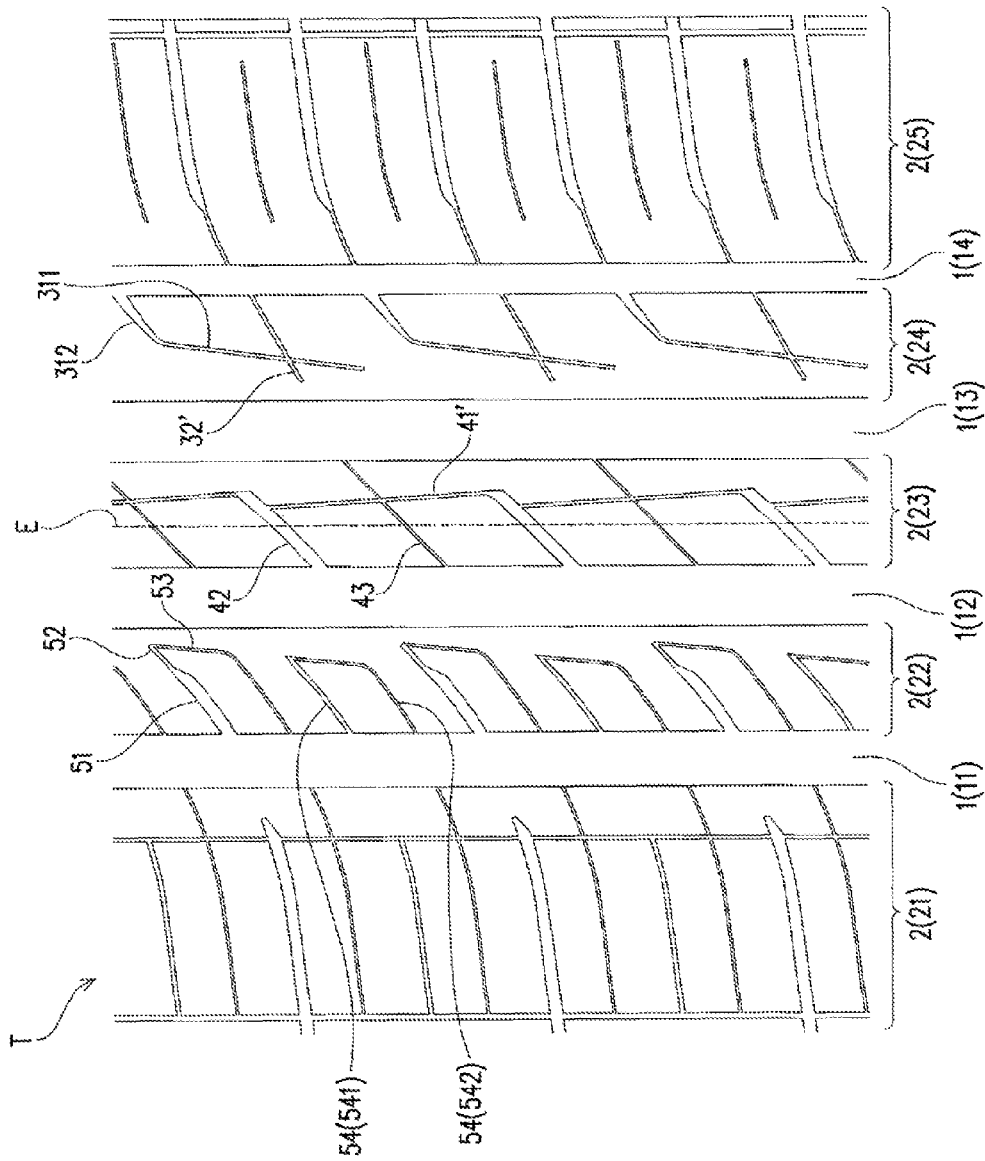
FIG. 7 is a view, from the radially outward direction, showing a tread pattern of a pneumatic tire according to Comparative Example 2 subjected to evaluation.
Figure 8:
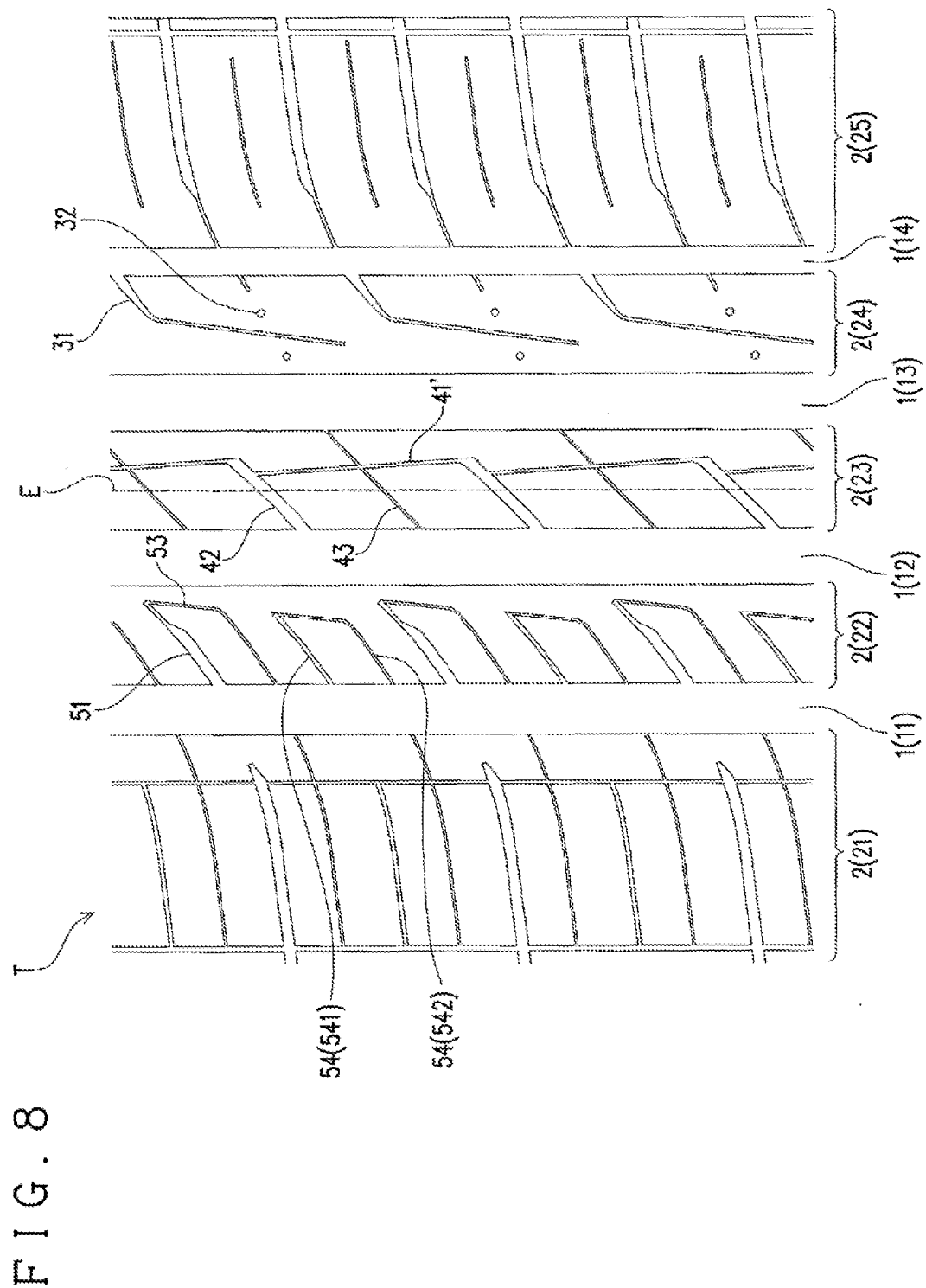
FIG. 8 is a view, from the radially outward direction, showing a tread pattern of a pneumatic tire according to Example 1 subjected to evaluation.
Figure 9:
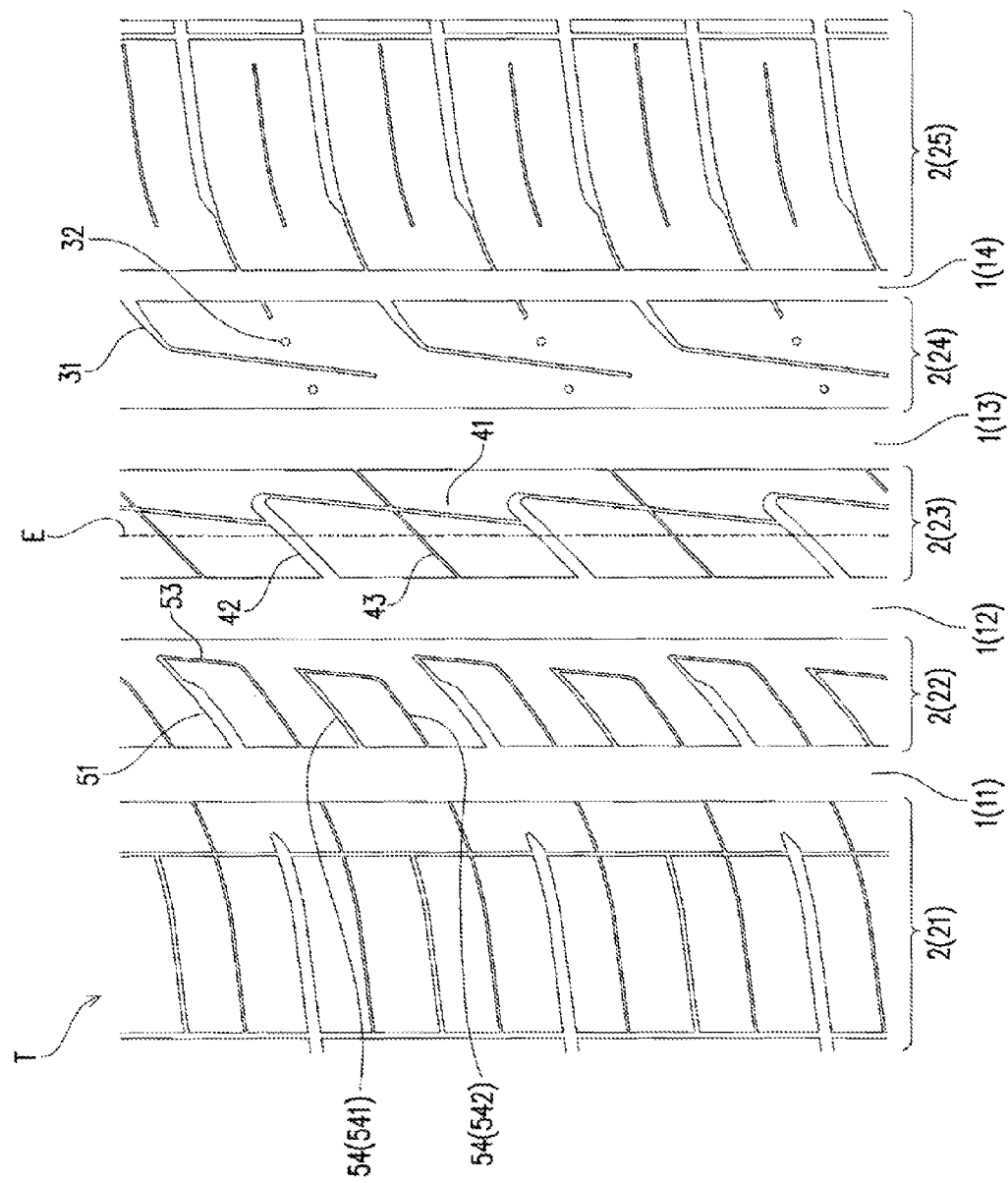
FIG. 9 is a view, from the radially outward direction, showing a tread pattern of a pneumatic tire according to Example 2 subjected to evaluation.

Next, the inventor of the present application experimentally produced tires respectively having tread patterns shown in FIG. 6 (Comparative Example 1), FIG. 7 (Comparative Example 2), FIG. 8 (Example 1), FIG. 9 (Example 2), and FIG. 1 (Example 3), which are then evaluated. The evaluation results are described below.

In the inner intermediate rib 22 of Comparative Example 1 shown in FIG. 6, the extended sipe 52 is not connected to the main groove 12 located on the inner side of the tire equator E. Further, in the center rib 23, a slightly oblique center sipe 41' connected to the oblique center groove 42 extends in a direction opposite to the direction in which the slightly oblique center sipe 41 shown in FIG. 1 extends (right down in the figure). Further, in the outer intermediate rib 24, a groove 311' is formed to have a larger width than the slightly oblique outer sipe 311 shown in FIG. 1, and a sipe 32' similar to the other sipe Z shown in FIG. 5A is formed to intersect this groove 311'.

Comparative Example 2 shown in FIG. 7 has almost the same tread pattern as shown in FIG. 6, except that the groove 311' is replaced with the slightly oblique outer sipe 311 shown in FIG. 1. Further, Example 1 shown in FIG. 8 has almost the same tread pattern as shown in FIG. 7, except that the sipe 32' is replaced with the intermittent sipe 32 shown in FIG. 1. Further, Example 2 shown in FIG. 9 has almost the same tread pattern as shown in FIG. 8, except that the center rib 23 has the pattern structure shown in FIG. 1.

Heel and toe wear was evaluated, in a condition where the tire has been worn away to the half depth of the main grooves 1 (50% wear), using the inverse of the dimension of the level difference ("high-low" difference in the radial direction) generated in the outer intermediate rib 24 due to the wear between each two land areas, with the sipe 32 or 32' interposed therebetween in the tire-circumferential direction, in terms of an index, with the value of Comparative Example 1 taken as 100.

Handling stability was evaluated with sensory tests by two drivers when driving a vehicle, on which the tires to be evaluated are mounted, on a dry road and on a wet road, in terms of an index, with the value of Comparative Example 1 taken as 100.

Uneven wear (including wear other than the heel and toe wear) was evaluated, in a condition where the tire has been worn away to the half depth of the main grooves 1 (50% wear), using the inverse of the dimensional difference in wear ("high-low" difference in the radial direction) between a relatively more worn portion and a relatively less worn portion in each of the center rib 23 and the outer intermediate rib 24, in terms of an index, with the value of Comparative Example 1 taken as 100. Further, the local wear of the inner intermediate rib 22 was evaluated in the same manner as the aforementioned uneven wear.

Noise was evaluated with sensory tests by two drivers when driving a vehicle, on which the tires to be evaluated are mounted, on a dry road in various driving modes, in terms of an index, with the value of Comparative Example 1 taken as 100.

Table 1 shows summary of results of each evaluation. The higher the numerical value, the higher the evaluation.

TABLE 1

|  | C. Ex. 1 | C. Ex. 2 | Ex. 1 | Ex. 2 | Ex. 3 |
|---|---|---|---|---|---|
| Corresponding FIG. No. | FIG. 6 | FIG. 7 | FIG. 8 | FIG. 9 | FIG. 1 |
| Heel and Toe Wear (Outer Intermediate Rib) | 100 | 105 | 110 | 110 | 110 |
| Handling Stability | 100 | 107 | 110 | 110 | 110 |
| Uneven Wear (between Center Rib and Outer Intermediate Rib) | 100 | 100 | 100 | 105 | 105 |
| Local Wear (Inner Intermediate Rib) | 100 | 100 | 100 | 100 | 105 |
| Noise | 100 | 105 | 105 | 105 | 107 |

As shown in Table 1, Examples 1 to 3 demonstrated higher results in the evaluation in the condition of 50% wear than Comparative Examples 1 and 2. In particular, Example 3 shown in FIG. 1 demonstrated the highest evaluation results. These results showed that the tire according to the present invention is superior to conventional tires.

Modifications of Embodiment

Hereinbefore, one embodiment of the present invention has been described. However, the present invention is not limited to such an embodiment. Various modifications can be made without departing from the scope of the invention.

For example, the tread pattern is not limited to those asymmetrical to the tire equator E as is the aforementioned embodiment, and may be symmetrical. Further, the tread pattern is applicable to a tire whose direction of rotation is designated.

Further, four main grooves 1 (11 to 14) are formed in the aforementioned embodiment. However, only one may be formed, or a plurality, such as two, three, five, or more of main grooves 1 may be formed.

Further, the slightly oblique outer sipe 311 is not necessarily a sipe, and may be a groove having a larger groove width than that of sipes. Further, the slightly oblique outer sipe 311 may be configured to have both ends opening into the main groove 13 or the outermost main groove 14 located on the outer side of the tire equator E through other grooves (such as the oblique outer groove 312), or to have both ends closed. Further, the slightly oblique outer sipe 311 of the aforementioned embodiment is a sipe formed to be oblique right up in the figure. However, it may be a sipe formed to be oblique, in a reverse direction, left up in the figure. Further, the slightly oblique outer sipe 311 may be a curved sipe. Further, the slightly oblique outer sipe 311 of the aforementioned embodiment has a length equal to or larger than the specific pitch (length P). However, the length may be smaller than the specific pitch. Further, it is also possible to employ a configuration in which adjacent two of the plurality of slightly oblique outer sipes 311 formed in the tire-circumferential direction at regular intervals, or each of the slightly oblique outer sipes 311 and the next one of the oblique outer grooves 312 are connected to each other by forming a groove that is different from both the slightly oblique outer sipe 311 and the oblique outer groove 312.

Further, in the aforementioned embodiment, the extension of the relatively wide groove 71 of the outermost rib 25 extending toward the sipe that is continuously located on the inner side of the relatively wide groove 71 and the position of the one end 312a of the oblique outer groove 312 are coincident with each other in the tire-circumferential direction. However, they may be configured not to be coincident.

Further, the number, the repetition number, and the combination of the small holes 321, the short sipe 322, and the solid parts 323 constituting the intermittent sipe 32 can be arbitrarily set. Further, the holes constituting the intermittent sipe 32 are not limited to circular holes such as the small holes 321 shown in FIG. 1. For example, elongated rectangular holes such as the short sipe 322, or holes of various shapes, such as elliptical, elongated circular, triangular, square, rhombus, hexagonal, and star-shaped holes can be employed. Further, the small holes 321 may be composed of only holes having a uniform shape, or a plurality of small holes 321 may be composed of holes having different shapes.

Further, in the aforementioned embodiment, the short sipe 322 of the intermittent sipe 32 is connected to the outermost main groove 14. However, the short sipe 322 may be formed more on the inner side than the end of the intermittent sipe 32, so that the intermittent sipe 32 is connected to the main groove 13 located on the outer side of the tire equator E. Further, the intermittent sipe 32 may be configured to have the one end 32a and the other end 32b opening respectively into the main groove 13 and the outermost main groove 14 located on the outer side of the tire equator E, or to have both ends closed. However, in order to avoid uneven wear (particularly, heel and toe wear), the intermittent sipe 32 is desirably not connected to the slightly oblique outer sipe 311. Further, the intermittent sipe 32 of the aforementioned embodiment has the extension 32X formed to be oblique right up in the figure. However, the extension 32X may be formed to be oblique, in a reverse direction, left up in the figure. Further, the intermittent sipe 32 may be formed to be orthogonal to the tire equator E (substantially parallel to the tire-width direction). Further, the extension 32X of the intermittent sipe 32 may have an arcuate shape. Further, in the aforementioned embodiment, the intermittent sipe 32 intersects the slightly oblique outer sipe 311 at a point about ⅔ (of the full length) upward from the other end 311b in the figure. However, the intersection is not limited thereto, and the intersection may be closer to the one end 311a, or closer to the other end 311b, than above. Further, in the aforementioned embodiment, the extension of the relatively wide groove 71 of the outermost rib 25 extending toward the sipe that is continuously located on the inner side of the relatively wide groove 71 and the one end 32a of the intermittent sipe 32 are almost coincident with each other in the tire-circumferential direction. However, they may be configured not to be coincident at all. Furthermore, in the aforementioned embodiment, the outward extension of the continuous sipe 43 of the center rib 23 and the inward extension of the intermittent sipe 32 are almost coincident in the tire-circumferential direction. However, they may be configured not to be coincident at all.

Further, the slightly oblique outer sipe 311 and the intermittent sipe 32 are not necessarily formed to correspond one by one. The intermittent sipe 32 may be formed to correspond to only a part of the plurality of slightly oblique outer sipes 311. Conversely, a plurality of intermittent sipes 32 may be formed, corresponding to one of the slightly oblique outer sipes 311. These allow the stiffness of the outer intermediate rib 24 to be an appropriate value. Further, the same combination of grooves as the combination of the slightly oblique outer sipe 311 and the intermittent sipe 32 may be formed in a rib other than the outer intermediate rib 24, such as in the center rib 23.

Further, the slightly oblique center sipe 41 may be configured to have both ends opening into the main groove 12 located on the inner side of the tire equator E or the main groove 13 located on the outer side of the tire equator E through other grooves (such as the oblique center groove 42), or to have both ends closed. Further, the slightly oblique center sipe 41 of the aforementioned embodiment is a sipe formed to be oblique right up in the figure. However, it may be a sipe formed to be oblique, in a reverse direction, left up in the figure. Further, the slightly oblique center sipe 41 may be a curved sipe.

Further, the continuous sipe 43 may be configured to have only one end opening into the main groove 12 located on the inner side of the tire equator E or the main groove 13 located on the outer side of the tire equator E, or to have both ends closed. Further, the continuous sipe 43 of the aforementioned embodiment is formed to be oblique right up in the figure. However, it may be formed to be oblique, in a reverse direction, left up in the figure. Further, the continuous sipe 43 may be formed to be orthogonal to the tire equator E (substantially parallel to the tire-width direction). Further, the continuous sipe 43 may be a curved sipe. Further, in the aforementioned embodiment, the continuous sipe 43 intersects the slightly oblique center sipe 41 substantially at the center of the slightly oblique center sipe 41. However, the intersection is not limited thereto, and may be closer to the one end 41a, or closer to the other end 41b.

Further, in the aforementioned embodiment, the pitch in the tire-circumferential direction at which the sets of the slightly oblique center sipe 41, the oblique center groove 42, and the continuous sipe 43 are formed in the center rib 23 is the same as the pitch in the tire-circumferential direction at which the sets of the slightly oblique outer sipe 311, the oblique outer groove 312, and the intermittent sipe 32 are formed in the outer intermediate rib 24. However, they may be different.

Configuration and Action of Embodiment

Finally, the configuration of the aforementioned embodiment and actions exerted by the configuration are summarized. The present invention provides a pneumatic tire including a tread T with a rib pattern, in which: the tread T includes at least one main groove 1 extending in the tire-circumferential direction, and a plurality of ribs 2, formed by the at least one main groove 1, extending in the tire-circumferential direction; at least one (the outer intermediate rib 24) of the plurality of ribs 2 has a plurality of narrow grooves 31 formed at intervals in the tire-circumferential direction; one or a plurality of intermittent sipes 32 are formed corresponding to at least one of the plurality of narrow grooves 31; the plurality of narrow grooves 31 are a plurality of grooves each having a groove width smaller than the at least one main groove 1 and having a portion extending substantially along the tire-circumferential direction; the intermittent sipes 32 each have a plurality of holes (small holes and a short sipe) 321 and 322 that are intermittently formed, and one or a plurality of solid parts 323 located between adjacent two of the plurality of holes 321 and 322; the plurality of holes 321 and 322 and the one or plurality of solid parts 323 are arranged in a direction intersecting the plurality of narrow grooves 31; and the one or plurality of intermittent sipes 32 each intersect the corresponding narrow groove 31 in one of the one or plurality of solid parts 323.

According to this configuration, the one or plurality of intermittent sipes 32 each intersect the corresponding narrow groove 31 in one of the one or plurality of solid parts 323. The formation of the one or plurality of intermittent sipes 32 allows the stiffness of the outer intermediate rib 24 formed with the plurality of narrow grooves 31 to be reduced to an appropriate extent. In addition, the region, surrounding each narrow groove 31, of the outer intermediate rib 24 is not divided by the one or plurality of intermittent sipes 32 so as to be in a continuous state. Accordingly, even when the tire rotates and the portion formed with the one or plurality of intermittent sipes 32 comes into contact with the road, the portion comes into contact with the road while being maintained in a continuous state as mentioned above. Therefore, as compared to the case where the portion in a divided state comes into contact with the road, the contact portion can be suppressed from deforming differently, with the one or plurality of intermittent sipes 32 serving as a boundary. As a result of this, uneven wear (particularly heel and toe wear) can be suppressed from occurring.

Further, the tire according to the present invention may have a configuration in which: the tread has an asymmetrical pattern with respect to the tire equator; at least part of each narrow groove 31 is formed of a sipe (the slightly oblique outer sipe 311); and the narrow grooves 31 and the intermittent sipes 32 are formed in one of the plurality of ribs 2 (the outer intermediate rib 24) that is located, when the tire is mounted on a vehicle, on the outer side of the vehicle with respect to the tire equator E.

According to this configuration, at least part of the narrow groove 31 is formed of a sipe having an extremely narrow groove width (the slightly oblique outer sipe 311), and the narrow grooves 31 and the intermittent sipes 32 are formed in the rib 2 (the outer intermediate rib 24) located on the outer side of the vehicle. Therefore, as compared to the case of the outer intermediate rib 24 formed with grooves each having a large groove width, the stiffness of the outer intermediate rib 24 in which the plurality of narrow grooves 31 each having at least part formed of a sipe (the slightly oblique outer sipe 311) are formed can be maintained appropriately high. Accordingly, deformation of the outer intermediate rib 24 can be suppressed, particularly during vehicle cornering. As a result, the vehicle handling stability can be improved.

Further, in one of the plurality of ribs 2 (center rib 25) which is located at the tire equator E, a plurality of sets of one slightly oblique center sipe 41 extending substantially along the tire-circumferential direction and one or a plurality of continuous sipes 43 extending to intersect the one slightly oblique center sipe 41 may be formed at intervals in the tire-circumferential direction.

According to this configuration, in the same manner as above, the region, surrounding each narrow groove 31, of the outer intermediate rib 24 is not divided by each intermittent sipe 32 so as to be in a continuous state. In contrast, in the center rib 25, the continuous sipe 43 intersect the slightly oblique center sipe 41, which brings the slightly oblique center sipe 41 into a divided state. Therefore, the center rib 25 is allowed to have a relatively low stiffness. Accordingly, it is possible to enhance the contact of the center rib 25 with the road, so as to improve the transmissibility of the driving force and braking force from the tire to the road. Further, the vibration absorbability is enhanced by the degree to which the stiffness is relatively reduced. Therefore, the driving noise (impact noise) generated from the tire can be reduced.

Further, the slightly oblique center sipe 41 may have a portion substantially parallel to one of the plurality of narrow grooves 31. This configuration allows the slightly oblique center sipe 41 to have uniform stiffness in the tire-circumferential direction in the substantially parallel portion. Therefore, the edges (groove edges) in the width direction of the ribs 23 and 24 which face the main groove 13 can be suppressed from being intensively worn partially in the circumferential direction due to the difference in stiffness. Further, it is possible to give a feeling of design unity to those who see the tire (tread T).

Further, each narrow groove 31 may have a configuration including the first groove part (slightly oblique outer sipe) 311 and the second groove part 312, in which the first groove part (slightly oblique outer sipe) 311 has an oblique angle of 3° to 20° with respect to the main groove 1 (the outermost main groove 14) adjacent to the narrow groove 31, and the second groove part 312 connects at least one of one end 311*a* and the other end 311*b* of the first groove part (slightly oblique outer sipe) 311 with the main groove 1 (the outermost main groove 14). According to this configuration, the first groove part (slightly oblique outer sipe) 311 of the narrow groove 31 is connected with the main groove 1 (the outermost main groove 14) via the second groove part 312 of the narrow groove 31. Therefore, water is allowed to flow efficiently into the main groove 1 (the outermost main groove 14) through the second groove part 312. Accordingly, even in the case where the road is wet due to rainfall, etc. (wet road), a water film is less likely to be formed between the road and the ribs 2 (the outer intermediate rib 24) formed with the plurality of narrow grooves 31. Thus, the decrease in the frictional force can be suppressed.

Further, one of the plurality of ribs 2 (the outermost rib 25) located at least in a region on one side in the tire-width direction may have a configuration including a plurality of grooves 71 and 72, each extending substantially along the tire-width direction, formed at a specific pitch (length P) in the tire-circumferential direction, in which the first groove part (slightly oblique outer sipe) 311 has the length 311L in the tire-circumferential direction equal to or larger than a length corresponding to a specific pitch P. According to this configuration, the first groove part (slightly oblique outer sipe) 311 has the length 311L in the tire-circumferential direction equal to or larger than a length corresponding to the specific pitch P. In this way, the first groove part (slightly oblique outer sipe) 311 has a large length that allows water present in the rib 2 (the outer intermediate rib 24) formed with the plurality of narrow grooves 31 to be guided rapidly to the first groove part (slightly oblique outer sipe) 311.

Further, the tire according to the present invention may have a configuration in which: the tread has an asymmetrical pattern with respect to the tire equator; each slightly oblique outer sipe 311 is oblique so that the one end 311*a* comes close to the main groove 1 (the outermost main groove 14) adjacent to the slightly oblique outer sipe 311 on the outer side of the vehicle; and the second groove part 312 is connected to the adjacent main groove 1 (the outermost main groove 14). According to this configuration, water is better channeled from the slightly oblique outer sipe 311 through the second groove part 312 to the main groove 1 (the outermost main groove 14) on a wet road.

Further, the tire according to the present invention may have a configuration in which: the tread has an asymmetrical pattern with respect to the tire equator; in at least one of the plurality of ribs 2 (the inner intermediate rib 22) which is located, when the tire is mounted on a vehicle, on the inner side of the vehicle with respect to the tire equator E, a plurality of F-shaped blocks 61 formed into a substantially F-shape by being defined by a plurality of sipes or grooves 51 to 54 are arranged adjacent to each other in the tire-circumferential direction; each of the F-shaped blocks 61 has the stem 611 extending along the tire-circumferential direction in a region, on the tire equator E side, of the inner intermediate rib 22, the first branch 612 branching from a point in the course in the circumferential direction of the stem 611 toward the side opposite to the tire equator E, and the second branch 613 branching from one end in the tire-circumferential direction of the stem 611 toward the side opposite to the tire equator E; the inner intermediate rib 22 has the first small block 62 interposed between the first branch 612 of one of each two of the F-shaped blocks 61 that are adjacent in the tire-circumferential direction and the second branch 613 of the other of the F-shaped blocks 61, and the second small block 63 surrounded by the stem 611, the first branch 612, and the second branch 613 of each of the F-shaped blocks 61; the first branch 612 and the second branch 613 each have a relatively high stiffness; and the first small block 62 and the second small block 63 each have a relatively low stiffness.

According to this configuration, the inner intermediate rib 22 has high stiffness in the outer region that is subjected to a high ground contact pressure, and has low stiffness in the inner region that is subjected to a low ground contact pressure. Therefore, a stiffness difference can be achieved corresponding to the ground contact pressure which is reduced in the inner region of the tread as compared to that in the outer region thereof, in the tire located on the outer side of the vehicle during cornering (turn). Further, the relatively reduced stiffness in the inner region of the rib makes vibration absorbability good, which can reduce the driving noise (impact noise) generated from the tire.

In the inner region of the inner intermediate rib 22, the first branch 612 and the second branch 613 are integrated with the stem 611 in the F-shaped block 61 and therefore each have a relatively high stiffness, and the first small block 62 and the second small block 63 each have a relatively low stiffness. In this inner region, the first small block 62, the first branch 612, the second small block 63, and the second branch 613 are disposed in this order in the tire-circumferential direction. Therefore, the inner region has a pattern structure in which the relative stiffness is alternately set to be "low •high •low •high" regularly in the tire-circumferential direction. Accordingly, it is possible to make the wear in the tire-circumferential direction uniform, as compared to the case of having a pattern structure in which the relative stiffness is not alternately set, for example, to be "high•low •low •high •high •low".

Further, the tire according to the present invention may have a configuration in which: the tread has an asymmetrical pattern with respect to the tire equator; the tread T includes a plurality of main grooves 1 extending in the tire-circumferential direction; and the outermost main groove 14 of the plurality of main grooves 1 which is located, when the tire is mounted on a vehicle, furthest from the tire equator E on the outer side of the vehicle has a smaller groove width than one or a plurality of other main grooves 1. According to this configuration, the two ribs 24 and 25 between which the outermost main groove 14 located furthest from the tire equator E on the outer side of the vehicle is interposed are allowed to have a relatively high stiffness as compared to other two ribs 2 between which another main groove 1 is interposed. Accordingly, the vehicle handling stability can be improved.

As described above, the present invention allows the region, surrounding each narrow groove, of a rib formed with intermittent sipes to be in a continuous state without being divided by each intermittent sipe. Accordingly, even when the tire rotates and the portion formed with the intermittent sipe comes into contact with the road, the portion comes into contact with the road in a continuous state, as mentioned above. Therefore, as compared to the case where the portion in a divided state comes into contact with the road, the contact portion can be suppressed from deforming differently, with the intermittent sipe serving as a boundary. Therefore, uneven wear (particularly heel and toe wear) is suppressed from occurring, thereby allowing a reduction in driving noise.

What is claimed is:

1. A pneumatic tire comprising a tread with a rib pattern, wherein:
   the tread includes at least one main groove extending in a tire-circumferential direction, and a plurality of ribs, formed by the at least one main groove, extending in the tire-circumferential direction;
   at least one of the plurality of ribs has a plurality of narrow grooves formed at intervals in the tire-circumferential direction;
   one or a plurality of intermittent sipes are formed corresponding to at least one of the plurality of narrow grooves;
   the plurality of narrow grooves are a plurality of grooves each having a groove width smaller than the at least one main groove and having a part extending substantially along the tire-circumferential direction;
   the intermittent sipes each have a plurality of holes that are intermittently formed, and one or a plurality of solid parts located between adjacent two of the plurality of holes;
   the plurality of holes and the one or plurality of solid parts are arranged in a direction intersecting the plurality of narrow grooves;
   the one or plurality of intermittent sipes each intersect a corresponding narrow groove in one of the one or plurality of solid parts;
   the tread has an asymmetrical pattern with respect to a tire equator;
   at least part of each of the narrow grooves is formed of a sipe;
   the narrow grooves and the intermittent sipes are formed in one of the plurality of ribs which is located, when the tire is mounted on a vehicle, on an outer side of the vehicle with respect to the tire equator; and
   in one of the plurality of ribs which is located at the tire equator, a plurality of sets of one circumferential sipe extending substantially along the tire-circumferential direction and one or a plurality of continuous sipes extending to intersect the one circumferential sipe are formed at intervals in the tire-circumferential direction.

2. The pneumatic tire according to claim 1, wherein:
   the circumferential sipe has a portion substantially parallel to one of the plurality of narrow grooves.

3. A pneumatic tire comprising a tread with a rib pattern, wherein:
   the tread includes at least one main groove extending in a tire-circumferential direction, and a plurality of ribs, formed by the at least one main groove, extending in the tire-circumferential direction;
   at least one of the plurality of ribs has a plurality of narrow grooves formed at intervals in the tire-circumferential direction;
   one or a plurality of intermittent sipes are formed corresponding to at least one of the plurality of narrow grooves;
   the plurality of narrow grooves are a plurality of grooves each having a groove width smaller than the at least one main groove and having a part extending substantially along the tire-circumferential direction;
   the intermittent sipes each have a plurality of holes that are intermittently formed, and one or a plurality of solid parts located between adjacent two of the plurality of holes;
   the plurality of holes and the one or plurality of solid parts are arranged in a direction intersecting the plurality of narrow grooves;
   the one or plurality of intermittent sipes each intersect a corresponding narrow groove in one of the one or plurality of solid parts;
   each of the narrow grooves has a first groove part and a second groove part;
   the first groove part has an oblique angle of 3° to 20° with respect to the main groove adjacent to the narrow groove;
   the second groove part connects at least one of one end and the other end of the first groove part with the main groove;
   one of the plurality of ribs which is located at least in a region on one side in a tire-width direction includes a plurality of grooves, each extending substantially along the tire-width direction, formed at a specific pitch in the tire-circumferential direction; and
   the first groove part has a length in the tire-circumferential direction equal to or larger than a length corresponding to the specific pitch.

4. A pneumatic tire comprising a tread with a rib pattern, wherein:
   the tread includes at least one main groove extending in a tire-circumferential direction, and a plurality of ribs, formed by the at least one main groove, extending in the tire-circumferential direction;
   at least one of the plurality of ribs has a plurality of narrow grooves formed at intervals in the tire-circumferential direction;
   one or a plurality of intermittent sipes are formed corresponding to at least one of the plurality of narrow grooves;
   the plurality of narrow grooves are a plurality of grooves each having a groove width smaller than the at least one main groove and having a part extending substantially along the tire-circumferential direction;
   the intermittent sipes each have a plurality of holes that are intermittently formed, and one or a plurality of solid parts located between adjacent two of the plurality of holes;
   the plurality of holes and the one or plurality of solid parts are arranged in a direction intersecting the plurality of narrow grooves;
   the one or plurality of intermittent sipes each intersect a corresponding narrow groove in one of the one or plurality of solid parts;
   the tread has an asymmetrical pattern with respect to a tire equator;
   in at least one of the plurality of ribs which is located, when the tire is mounted on a vehicle, on the inner side of the vehicle with respect to the tire equator, a plurality of F-shaped blocks formed into a substantially F-shape by being defined by a plurality of sipes or grooves are arranged adjacent to each other in the tire-circumferential direction;
   each of the F-shaped blocks has a stem extending along the tire-circumferential direction in a region, on the tire equator side, of at least one rib located on an inner side of the vehicle, a first branch branching from a point in a course in the circumferential direction of the stem toward a side opposite to the tire equator, and a second branch branching from one end in the tire-circumferential direction of the stem toward a side opposite to the tire equator;

in the at least one rib located on the inner side of the vehicle with respect to the tire equator, a first small block is interposed between the first branch of one of each two of the F-shaped blocks that are adjacent in the circumferential direction and the second branch of the other of the F-shaped blocks, and a second small block is surrounded by the stem, the first branch, and the second branch of each of the F-shaped blocks;

the first branch and the second branch each have a relatively high stiffness; and the first small block and the second small block each have a relatively low stiffness.

* * * * *